Nov. 5, 1935.   C. A. JONES   2,020,190
TIRE
Filed Jan. 3, 1934
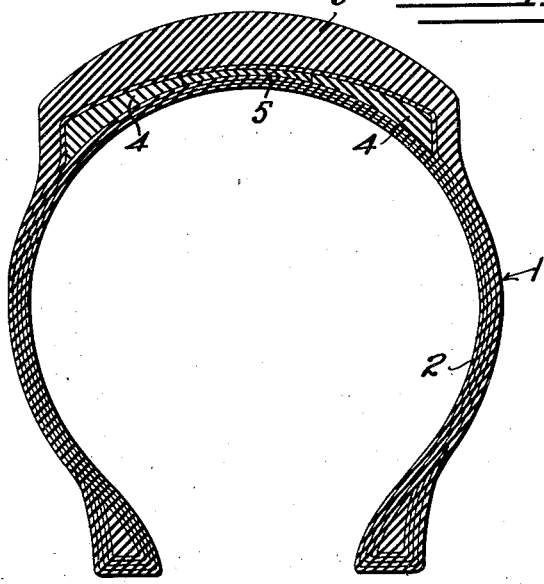
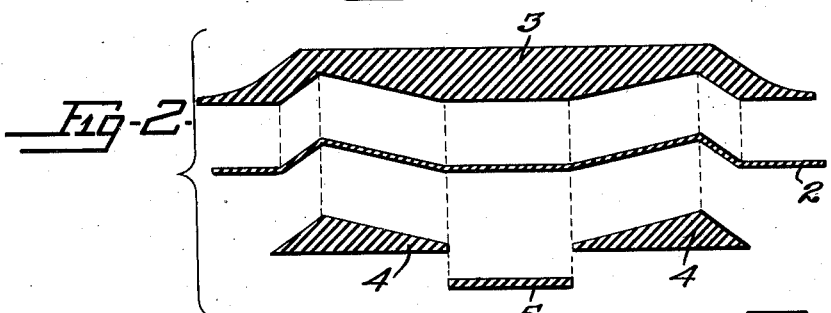
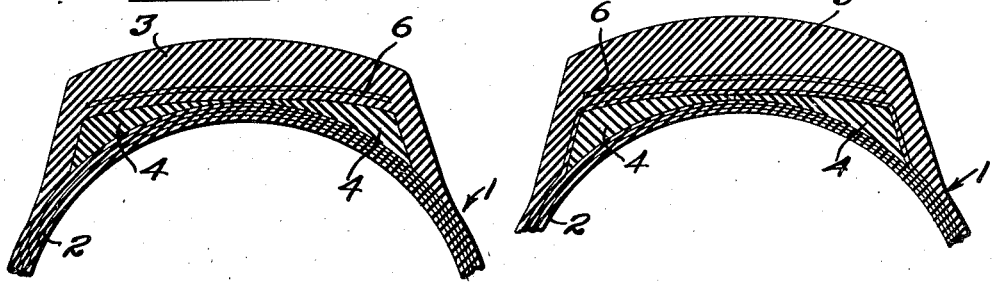
Clarence A. Jones
INVENTOR
BY Victor J. Evans & Co.
ATTORNEY Patented Nov. 5, 1935

2,020,190

UNITED STATES PATENT OFFICE 2,020,190

TIRE

Clarence A. Jones, South Gate, Calif.

Application January 3, 1934, Serial No. 705,125

1 Claim. (Cl. 152—13)

This invention relates to tires and has for the primary object the provision of a tire construction which will afford longer life and will be capable of withstanding maximum load strains and shocks and which have better riding qualities than obtained from tires of the conventional construction.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a transverse sectional view illustrating a tire with my invention forming a part of the construction of said tire.

Figure 2 is a diagrammatical sectional view illustrating my invention.

Figure 3 is a fragmentary transverse sectional view illustrating a modified form of my invention.

Figure 4 is a similar view illustrating the use of my invention in conjunction with the conventional type of breaker strip.

Figure 5 is a fragmentary perspective view partly in section illustrating another shape in which the breaker elements of my invention may be made.

Referring in detail to the drawing, the numeral 1 indicates the carcass of a tire, consisting of the usual layers of fabric or cords 2 with the outermost layer lying within the tread 3 of the tire and spaced from the adjacent layer to form a chamber extending substantially the full width of the tread and providing to the tread a breaker strip which extends from one bead to the other bead of the carcass. Arranged within the chamber are breaker cushions 4 constructed of rubber or any other suitable material and are relatively spaced to receive therebetween a breaker cushion 5 constructed from a material capable of having durability with maximum cushioning qualities. It is to be understood that the cushion 5 is of rubber, the quality of which is capable of affording the above set forth results. The breaker cushions 4 are of substantially triangular shape in cross section and taper towards the opposite edges thereof with the taper towards one edge being at a greater angle than the taper towards the opposite end. During the construction of the carcass, the breaker cushions 4 and breaker cushion 5 are built into said carcass and when subjected to vulcanizing under pressure, the cords of the outermost layer embed within the breaker cushions and cushion strip and cooperate with said breaker cushions 4 and 5 in forming a cushioned reinforcement for the tread which extends substantially the full width of said tread and the outermost layer of fabric or cords forming a part of the reinforcement and extending to the beads of the carcass provides a desirable reinforcement to the side walls of the carcass. The reinforcement also strengthens the side walls of the tread to prevent shocks to said walls of the tread from causing blowouts and loose treads. My invention built into the carcass as described will eliminate the use of the breaker strip now used in tire construction. The tread 3 when prepared for the carcass 1 has the inner face recessed or shaped, as shown in Figure 2, to correspond with the shapes of the breaker cushions 4 and 5 so that when the tire after being constructed and is subjected to vulcanizing under pressure within a mold, the inner face of the tread and breaker cushions 4 and 5 assume the shape, as shown in Figure 1, with the breaker cushions 4 and 5 engaged with the outermost layer and the layer adjacent thereto of the carcass.

Road shocks which bruise or otherwise injure the casing cause blowouts and my invention distributes and absorbs these shocks and thereby materially increases the life of the casing.

In some tire constructions where it is desired to employ a breaker strip 6, as shown in Figure 3, the breaker cushions 4 of my invention are placed between the inner face of the tread and the outer layer of the carcass with the breaker cushions 4 in abutting engagement or, as shown in Figure 4, the breaker cushions 4 may be placed between the outer layer of the carcass and the layer adjacent thereto so that the outer layer extends into the tread and lies in close proximity to the breaker strip. Instead of constructing the breaker cushions 4, as shown in Figure 2, they may be shaped, as shown in Figure 5.

What is claimed is:

A tire comprising a carcass including beads at the side edges thereof and a series of layers of fabric, one of which extends from one bead to the other bead to provide a breaker strip and having a portion thereof spaced from the adjacent layer to provide a chamber located at the tread portion of the carcass, a tread on said carcass, and intermediate and outer breaker cushions located in the chamber and bearing against the layers defining the chamber, said outer breaker cushions being of a substantially triangular shape in cross section.

CLARENCE A. JONES.